Oct. 21, 1958     M. F. MAGUIRE     2,857,122
ATTITUDE CONTROL SYSTEM
Filed July 18, 1956
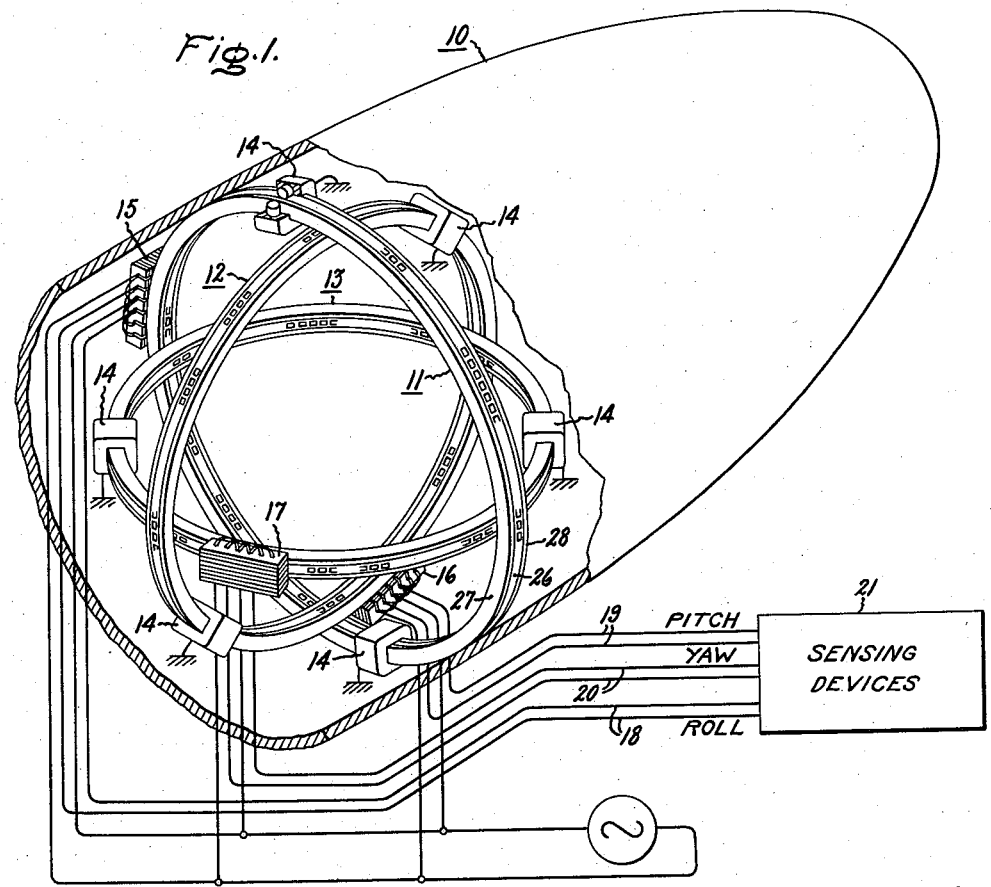
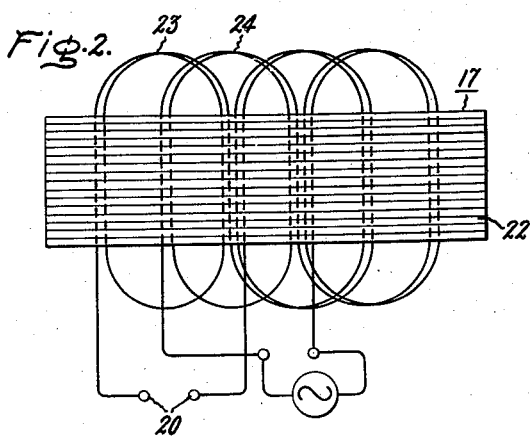
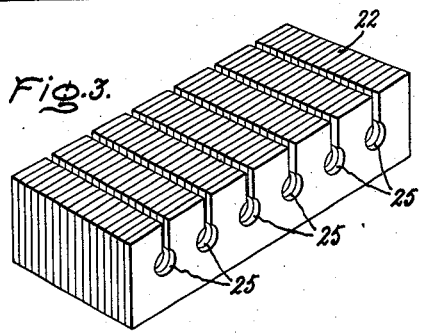
Inventor:
Michael F. Maguire,
by Alfred B. Levine
His Attorney.

2,857,122

ATTITUDE CONTROL SYSTEM

Michael F. Maguire, Wayne, Pa., assignor to General Electric Company, a corporation of New York Application July 18, 1956, Serial No. 598,587

7 Claims. (Cl. 244—93)

This invention generally relates to the attitude control of navigable bodies passing through a fluid or a non-fluid medium, and more particularly to the attitude control of such bodies of internal means.

Conventional techniques for controlling the attitude of the bodies such as aircraft, ships, submarines, and the like passing through fluid mediums, depend upon the torque reaction of the fluid against the rudder, elevator, aileron or other appendage to the craft. However, in the event that the craft is moving through a substantially non-fluid medium, such as beyond the atmosphere of the earth, the craft attitude cannot be controlled in this manner because of the substantial absence of any fluid to react with the craft appendages.

In a prior application of Robert Haviland, Serial No. 598,618, filed July 18, 1956, there is disclosed and claimed a system for controlling the attitude of a navigable body passing through a substantially non-fluid or vacuum medium, for example, in outer space, by employing the moment of momentum of a fluid circulating about a given axis, to exert a controllable reaction force upon the craft. More specifically, in this prior application there is provided at least one endless conduit within which is circulated at variable speeds a relatively heavy fluid. Movement of the fluid through the conduit produces a moment of momentum reacting against the craft in such a manner as to provide a torque to turn the craft. By suitably orienting this conduit the torque is produced about a desired craft axis; and by variably controlling the rate and direction of circulating the fluid, the amplitude and polarity of this torque is varied to control the craft attitude as desired.

In accordance with the present invention, there is provided a means for displacing a weighted material at a controllable rate and in a desired direction or directions within the craft in such a manner as to produce variable moments of momentum which can control the attitude of the craft independently of the absence or presence of a fluid medium outside of the craft. However, rather than pumping a fluid to provide this turning moment as in the above prior application, the present invention employs at least one endless ring member which is controllably and reversably rotated about a desired axis.

It is accordingly one object of the present invention to provide a relatively light weight and dependable means occupying a minimum volume for controlling the attitude of a craft movable through a fluid or non-fluid medium.

Another object of the present invention is to provide such an attitude control operating entirely inside the craft and independently of the medium.

Other objects and many attendant advantages will be more readily comprehended to those skilled in the art upon a detailed consideration of the following specification taken with the accompanying drawings wherein:

Fig. 1 is a perspective view, partially cut away, depicting one preferred embodiment of the invention, and Figs. 2 and 3 are views illustrating preferred motor driving means as employed in the embodiment of Fig. 1.

Referring now to Fig. 1 for a detailed consideration of one preferred embodiment of the invention, there is generally shown an aircraft or watercraft body structure 10 within which are fixedly positioned three orthogonally arranged endless ring members 11, 12, and 13, each of which is preferably circularly formed as shown. Ring 11 is preferably positioned within the craft in a geometrical plane perpendicular to the roll axis of the craft, ring 12 is preferably positioned in a geometrical plane perpendicular to the pitch axis of the craft, and ring 13 is preferably positioned within the craft in a geometric plane perpendicular to the yaw axis of the craft.

Each of these rings is rotatably supported by suitable bearing 14 and adapted to be reversedly driven or rotated about its corresponding axis at variable speeds or maintained motionless by a suitable motor 15, 16, and 17, respectively. Each of these motors in turn is adapted to be electrically energized over lines 18, 19, and 20, respectively, by signals from suitable sensing devices mounted upon the craft, such as gyroscopes, accelerometers, or the like (not shown), that for purposes of illustration are shown as being housed in a box 21 labeled "sensing devices."

In operation, the accelerometer or other sensing device (not shown) within box 21 detects attitude deviation, acceleration, or other disturbance of the craft about its yaw axis, for example, and after suitable amplification generates an electrical signal over line 20 proportional thereto in polarity and amplitude. This signal energizes motor 17 to rotate ring 13 in such a manner as to develop a reaction force or moment of momentum within the craft sufficient to counteract the original disturbance about this yaw axis. In a similar manner other appropriate sensing devices within box 21 detect disturbances about one or more of the craft stability axes and control the direction, speed, and acceleration of the rings 12 and 13 to suitably stabilize or control the craft about its other stability axes, as desired.

Although but three of such rings are shown, it is believed evident that the number and placement of such rings are dependent upon the stability or control needed for a particular craft and either a greater or lesser number of such rings, arranged as desired, may be employed.

As shown by Figs. 2 and 3, the preferred electrical motor means 17 for controlling the rotation and the direction of rotation of ring 13 comprises a two phase induction motor having a planar stator member 22 with two physically displaced windings 23 and 24 suitably wound thereon within slots 25 and energized by 90° time phase displaced A.-C. sources as to provide a moving electromagnetic flux that travels in a linear path along the stator 22 rather than as a rotating path as in conventional two phase induction motors. The ring 13 itself forms the rotor for this linear motor and is adapted to be rotated by the motor action occurring between the circulating currents induced in the ring and this traveling magnetic field. For this reason the ring is preferably formed in a manner similar to a squirrel cage induction rotor and is provided with an inner band 26 of ferromagnetic material of iron or the like within which is embedded a plurality of spaced conducting bars which are aligned transverse to the band 26 and whose ends are electrically connected together or shorted by two conducting outer rings 27 and 28, fastened on either side of the inner band and connected to the conducting bars. In a manner similar to the operation of the conventional two phase induction motor, the traveling magnetic flux induces circulating currents within the rotor and these circulating currents react after a given phase displacement with this rotating magnetic field to propel the ring along the stator. As is well known to those skilled in the art, the speed of rotation of a two phase induction motor may be controlled within limits, by varying the amplitude of one of the 90° phase displaced stator windings 23 or 24 thereby to vary the "slippage" between the movement of the rotor and the speed of the traveling electric field. Similarly, the direction of rotation may be reversed by reversing the phase of one of these stator windings by 180 electrical degrees.

Although but one preferred embodiment of the present invention has been illustrated and described, it is believed evident that many changes may be made by those skilled in the art without departing from the spirit and scope of this invention. Accordingly, this invention is to be considered as being limited only in accordance with the following claims appended hereto.

What is claimed is:

1. In a device for stabilizing the attitude of a craft, movable through a fluid or substantial vacuum, about a given axis, an endless circular ring, reversible motor means energizable by a signal proportional to a disturbance of said craft about said axis for reversibly rotating said ring at a speed proportional to said signal, said circular ring being rotatably positioned within said craft to rotate about a fixed axis parallel to said given axis.

2. In a device of claim 1, a plurality of such rings, and each being positioned within said craft to rotate about a different fixed axis relative to said craft.

3. In a device for controlling a craft, through a fluid and non-fluid medium, about a given axis fixed with respect to the craft, means responsive to disturbances of the craft about said axis for generating a signal proportional thereto, an endless circular ring rotatably mounted within said craft to rotate about an axis parallel to said given axis, and propelling means responsive to said electrical signal for rotating said ring at a speed and in a direction to generate a moment of momentum within the craft for counteracting said disturbance.

4. In the device of claim 3, a plurality of said rings, and each being positioned within said craft to rotate about an axis parallel to a different fixed axis relative to said craft.

5. In the device of claim 4, said rings being orthogonally arrayed whereby said craft may be controlled about mutually perpendicular axis.

6. In the device of claim 5, said propelling means including a two phase energized induction motor stator and said ring forming the induction rotor adapted to be propelled thereby.

7. In a device for stabilizing the attitude of a craft movable through a fluid or substantial vacuum, about a given axis, an endless circular ring, reversible motor means energizable by a signal proportional to a disturbance of said craft about said axis for reversibly rotating said ring at a speed proportional to said signal, said circular ring being positioned within said craft to rotate about a fixed axis parallel to said given axis, said reversible motor means including a two phase energized induction motor stator and said ring forming the induction rotor adapted to be propelled thereby.

References Cited in the file of this patent

UNITED STATES PATENTS

| | | |
|---|---|---|
| 2,158,180 | Goddard | May 16, 1939 |
| 2,734,383 | Paine | Feb. 14, 1956 |